Figure 1:
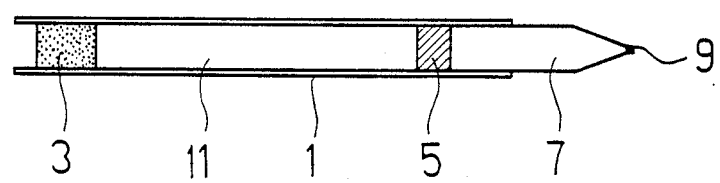

United States Patent [19]

Inoue et al.

[11] Patent Number: 4,545,818

[45] Date of Patent: Oct. 8, 1985

[54] AQUEOUS INK COMPOSITIONS FOR BALL-POINT PENS

[75] Inventors: Shigeyasu Inoue, Kashihara; Hiroyoshi Yamamoto, Osaka, both of Japan

[73] Assignee: United Kingdom Atomic Energy Authority, England

[21] Appl. No.: 540,755

[22] Filed: Oct. 11, 1983

[30] Foreign Application Priority Data

Oct. 20, 1982 [JP] Japan .................................. 57-185683
Jan. 28, 1983 [JP] Japan ................................... 58-13120

[51] Int. Cl.$^4$ ............................................. C09D 11/00
[52] U.S. Cl. ...................................... 106/22; 106/20; 106/23; 106/25
[58] Field of Search ....................... 106/20, 25, 22, 23

[56] References Cited

U.S. PATENT DOCUMENTS

| | | | |
|---|---|---|---|
| 3,073,707 | 1/1963 | Clark | 106/22 |
| 3,115,410 | 12/1963 | Huffman | 106/25 |
| 4,062,644 | 12/1977 | Sponaes et al. | 106/25 |
| 4,271,142 | 6/1981 | Puglia et al. | 426/89 |
| 4,302,253 | 11/1981 | Ciullo | 106/208 |

*Primary Examiner*—Prince E. Willis
*Attorney, Agent, or Firm*—Larson and Taylor

[57] ABSTRACT

An aqueous ink composition for ball-point pens which comprises (i) 84.5 to 99.7 parts by weight of an aqueous medium consisting of 40 to 95% by weight of water and 60 to 5% by weight of a wetting agent, (ii) 0.1 to 15 parts by weight of a water-soluble or water-dispersible coloring agent and (iii) 0.2 to 0.45 part by weight of xanthan gum in 100 parts by weight of the total composition; and an aqueous ink composition for ball-point pens which comprises (i) 74.5 to 99.2 parts by weight of an aqueous medium consisting of 33 to 95% by weight of water and 67 to 5% by weight of a wetting agent, (ii) 0.1 to 15 parts by weight of a water-soluble or water-dispersible coloring agent, (iii) 0.2 to 0.45 part by weight of xanthan gum and (iv) 0.5 to 10 parts by weight of a permeable organic solvent in 100 parts by weight of the total composition.

28 Claims, 1 Drawing Figure

AQUEOUS INK COMPOSITIONS FOR BALL-POINT PENS

This invention relates to aqueous ink compositions for ball-point pens.

Aqueous ink compositions for ball-point pens must have the following properties: excellent "cap-off" property (property of retaining writability for a prolonged period of time with the cap removed from the pen); viscosity or flowability suitable for smooth writing with a line of uniform width corresponding to the ball of specific diameter; property of flowing to the tip of the pen without interruption when rapidly writing; property of producing a writing without accumulating any residue of ink components at the tip of the pen; high storage stability for a prolonged period of time; no action of corroding the metal parts of the pen; etc. However, some of these properties are incompatible with other properties. For example, known aqueous ink compositions having good cap-off property are so viscous that the flow to the tip of the pen is prone to an interruption. For this reason, conventional aqueous ink compositions remain to be improved in many respects and thus it is desired to develop novel aqueous ink compositions with satisfactorily improved properties.

Directing attention to these problems, we conducted various experiments and research and found that an aqueous ink composition for ball-point pens can be prepared which has all the required properties as stated above, when a specific amount of xanthan gum is incorporated therein. More specifically, this invention provides an aqueous ink composition for ball-point pens which comprises, per 100 parts by weight of the composition, (i) 84.5 to 99.7 parts by weight of an aqueous medium consisting of 40 to 95% by weight of water and 60 to 5% by weight of a wetting agent, (ii) 0.1 to 15 parts by weight of a water-soluble or water-dispersible coloring agent and (iii) 0.2 to 0.45 part by weight of xanthan gum.

Our research revealed that while the foregoing xanthan gum-containing ink composition has slightly lowered ability to dry on writing, the drying ability can be enhanced by adding to the composition a specific amount of an organic solvent penetrable into paper, fiber or the like (hereinafter referred to as permeable drying). Based on this novel finding, this invention also provides an aqueous ink composition for ball-point pens which comprises, per 100 parts by weight of the composition, (i) 74.5 to 99.2 parts by weight of an aqueous medium consisting of 33 to 95% by weight of water and 67 to 5% by weight of a wetting agent, (ii) 0.1 to 15 parts by weight of a water-soluble or water-dispersible coloring agent, (iii) 0.2 to 0.45 part by weight of xanthan gum and (iv) 0.5 to 10 parts by weight of a permeable organic solvent.

Xanthan gum to be used in the present invention is a water-soluble high-molecular-weight heteropolysaccharide. The amount of xanthan gum to be used is 0.20 to 0.45% based on the weight of the composition. If the amount of xanthan gum is less than 0.20 weight %, it is difficult to provide a smooth writing. Amounts of greater than 0.45% of xanthan gum increase the viscosity of the composition, thereby tending to deteriorate the ability of the ink to flow continuously from the tip of the pen. Preferred content of xanthan gum is 0.30 to 0.40% based on the weight of the composition.

The permeable drying agent to be used in the present invention causes the composition to penetrate more easily through paper, fiber, or the like, consequently enhancing the drying ability of the ink and improving the property of producing a smooth writing. Examples of useful permeable drying agents are given below.

(a) Glycol ethers such as ethylene glycol monomethyl ether, ethylene glycol monoethyl ether, ehtylene glycol monobutyl ether, ethylene glycol monophenyl ether, diethylene glycol monomethyl ether, diethylene glycol monoethyl ether, diethylene glycol monoisopropyl ether, diethylene glycol monobutyl ether, diethylene glycol monophenyl ether, ethylene glycol dimethyl ether, ethylene glycol diethyl ether, diethylene glycol dimethyl ether, propylene glycol monomethyl ether, etc.

(b) Glycol ether acetates such as ethylene glycol monomethyl ether acetate, ethylene glycol monoethyl ether acetate, ethylene glycol monobutyl ether acetate, ethylene glycol monophenyl ether acetate, diethylene glycol monomethyl ether acetate, diethylene glycol monoethyl ether acetate, diethylene glycol monobutyl ether acetate, diethylene glycol monophenyl ether acetate, diethylene glycol monoisopropyl ether acetate, ethylene glycol dimethyl ether acetate, ethylene glycol diethyl ether acetate, diethylene glycol dimethyl ether acetate, propylene glycol monomethyl ether acetate, etc.

(c) Glycol acetates such as ethylene glycol monoacetate, ethylene glycol diacetate, diethylene glycol diacetate, etc.

Among these permeable drying agents, it is preferred to use ethylene glycol monophenyl ether, diethylene glycol monobutyl ether, diethylene glycol monobutyl ether acetate, ethylene glycol monoacetate, ethylene glycol diacetate, etc. The permeable drying agent is used in an amount of 0.5 to 10%, preferably 1 to 5%, based on the weight of the composition. With the content of less than 0.5%, the ability to dry on writing is not enhanced, whereas above 10%, the composition is likely to blur on paper and the writing produced is apt to be visible through the paper on the other side. The permeable drying agent can be used singly or in admixture of more than one species.

The components of the present ink composition other than xanthan gum and permeable drying agent are identical with those for known ink compositions in the kind and the amount.

When desired, at least one of surfactant, preservative, pH-adjusting agent, corrosion inhibitor and like additives conventionally used in the art may be incorporated in the aqueous ink composition of this invention in an amount of up to about 10% based on the weight of the composition.

Examples of useful components for the present ink composition other than xanthan gum and permeable drying agent are as given below and each of these components can be used singly or two or more kinds of each component can be employed in mixture.

I. Wetting Agent

The wetting agent to be used are hygroscopic and capable of inhibiting the evaporation of water. Examples of useful wetting agents are given below.

1. Dihydric alcohols such as ethylene glycol, diethylene glycol, triethylene glycol, 1,3-propanediol, propylene glycol, 1,3-butylene glycol, 1,4-butanediol, 2,3-butylene glycol, neopentyl glycol, hexylene glycol, thiodiglycol, etc. 2. Tri- and higher-hydric alcohols such as glycerin, trimethylolethane, trimethylolpropane, 3-methyl pentane-1,3,5-triol, diglycerin, sorbitol, etc.

3. Other wetting agents including pyrrolidone, N-methyl-2-pyrrolidone, dimethylformamide, urea, etc.

II. Coloring Agent

1. Pigments such as titanium oxide, carbon black, Carmine 6B, C.I. Pigment Red 112, C.I. Pigment Blue 15, C.I. Pigment Green 7, etc.

2. Acid dyes such as Acid Red 87 (represented by C.I. number, the same hereinafter), Acid Red 92, Acid Yellow 23, Acid Blue 9, Acid Violet 49, Acid Blue 7, Acid Orange 56, Acid Black 2, Acid Red 18, etc.

3. Direct dyes such as Direct Black 19 (represented by C.I. number, the same hereinafter), Direct Black 38, Direct Black 154, Direct Orange 6, Direct Yellow 44, Direct Yellow 87, Direct Blue 71, etc.

III. Additive 1. (i) Nonionic surfactants such as polyethylene glycol oleyl ether, polyethylene glycol nonyl phenyl ether, polyethylene glycol polypropylene glycol ether, ethylene oxide adduct of 2,4,7,9-tetramethyl-5-decyl-4,7-diol, etc.

(ii) anionic surfactants such as naphthalenesulfonic acid-formalin condensation product, dialkyl sulfosuccinate and sodium salt thereof, etc.

2. Preservatives such as potassium sorbate, sodium benzoate, sodium pentachlorophenol, sodium dehydroacetate, etc.

3. pH-adjusting agents such as sodium hydroxide, sodium carbonate, triethanolamine, etc.

4. Corrosion inhibitors such as benzotriazole, tolyltriazole, dicyclohexyl ammonium nitrate, etc.

More preferable wetting agents are polyhydric alcohols. The preferred amount of the wetting agent is 5 to 40% based on the weight of the aqueous medium. Over 60% of the wetting agents tends to increase the viscosity of the composition and to cause the composition to blur on paper in writing, whereas less than 5% of the agent deteriorates the storage stability and cap-off property of the composition.

The ink composition of the present invention is prepared, for example, by gradually adding xanthan gum to water being stirred at room temperature to completely dissolve the gum in the water, and adding to the solution a polyhydric alcohol, or a polyhydric alcohol and a permeable drying agent, a coloring agent and, when required, other additive or additives to obtain a solution or a uniform dispersion.

The ink compositions of the present invention are outstanding in storage stability and retains adequate viscosity and flowability for a prolonged period of time. With these excellent properties, the present ink compositions are very useful for ball-point pens of "ink-free" type which comprises, as shown in the accompanying drawing, FIG. 1, a body 1, a stopper 3, a member 5 for adjusting the flow of the ink composition, a forward end portion 7, a ball 9 and an intermediate hollow portion 11 serving as the tank containing the ink composition, and a cap (not shown).

Examples and Comparison Examples are given below to clarify the features of the present invention. The following properties of the ink compositions prepared were determined by the methods described below and the results were evaluated according to criteria set forth hereinafter.

(1) Cap-off Property

The compositions were tested to determine how long a writing can be produced with the cap removed from the pen. The result was evaluated according to the following criteria.

A: Over 48 hours
B: 24 to 48 hours
C: Less than 24 hours

(2) Flowability

The pen was moved at a speed of 4 m/min under a load of 100 g while being inclined at an angle of 75 degrees with respect to the surface of the paper to determine the amount of the composition as consumed in producing a continuous line of 100 m on the paper. The result was evaluated according to the following criteria.

A: 100 to 200 mg
B: 50 to less than 100 mg or more than 200 to 250 mg
C: Less than 50 mg or over 250 mg

(3) Rapid Writability

The ink compositions were tested to determine the rate of writing at which the flow of the composition was interrupted in writing under a load of 100 g with the pen inclined at an angle of 75 degrees with respect to the surface of the paper. The result was evaluated according to the following criteria.

A: Over 15 m/min
B: 10 to 15 m/min
C: Less than 10 m/min

(4) Accumulated Residue of Ink Components

The compositions were tested to check whether residue of ink components was accumulated at the tip of the pen after writing at an ordinary speed. The composition accumulating no residue of ink components was ranked as A and that accumulating a small amount of residue of ink components as B.

(5) Drying Ability

A letter V was written on wood-free paper and thereafter was touched with a finger tip to determine the time (second) required for drying.

(6) Blurring

A letter V was written on wood-free paper and the paper was observed to find whether the deposited composition was blurred on the paper. The result was evaluated according to the following criteria.

A: No blurring
B: Slight blurring
C: Blurring

EXAMPLE 1 TO 9 AND COMPARISON EXAMPLES 1 AND 2

Ink compositions were prepared by using the materials (parts by weight) as shown in Tables 1 and 2 below.

TABLE 1

| Component | Example | | | | | |
| --- | --- | --- | --- | --- | --- | --- |
| | 1 | 2 | 3 | 4 | 5 | 6 |
| Water | 61.80 | 61.75 | 61.70 | 61.65 | 61.60 | 61.55 |
| Xanthan gum[1] | 0.20 | 0.25 | 0.30 | 0.35 | 0.40 | 0.45 |
| Ethylene glycol | 21.0 | 21.0 | 21.0 | 21.0 | 21.0 | 21.0 |

TABLE 1-continued

| Component | Example 1 | 2 | 3 | 4 | 5 | 6 |
|---|---|---|---|---|---|---|
| Glycerin | 10.0 | 10.0 | 10.0 | 10.0 | 10.0 | 10.0 |
| Sodium benzoate | 1.0 | 1.0 | 1.0 | 1.0 | 1.0 | 1.0 |
| C.I. Acid Red 87[2] | 4.5 | 4.5 | 4.5 | 4.5 | 4.5 | 4.5 |
| C.I. Acid Red 92[3] | 1.0 | 1.0 | 1.0 | 1.0 | 1.0 | 1.0 |
| C.I. Acid Yellow 23[4] | 0.5 | 0.5 | 0.5 | 0.5 | 0.5 | 0.5 |
| Viscosity[5] 20 ± 1° C. (cp) | | | | | | |
| 2.5 rpm | — | — | — | — | — | — |
| 5.0 rpm | — | — | — | — | — | 667.8 |
| 10.0 rpm | 122.1 | 165.5 | 223.6 | 278.7 | 326.3 | 390.2 |
| 20.0 rpm | 77.5 | 100.3 | 135.0 | 165.2 | 194.2 | 225.9 |
| 50.0 rpm | 44.5 | 56.9 | 72.9 | 88.1 | 102.8 | 117.4 |
| 100.0 rpm | 30.8 | 38.3 | 47.8 | — | — | — |
| Color of ink | | | | Red | | |

TABLE

| Component | Example 7 | 8 | 9 | Comp. Example 1 | 2 |
|---|---|---|---|---|---|
| Water | 62.15 | 62.68 | 37.67 | 61.85 | 61.50 |
| Xanthan gum[1] | 0.35 | 0.32 | 0.33 | 0.15 | 0.50 |
| Ethylene glycol | 21.0 | 21.0 | 21.0 | 21.0 | 21.0 |
| Glycerin | 10.0 | 10.0 | 10.0 | 10.0 | 10.0 |
| Sodium benzoate | 1.0 | 1.0 | 1.0 | 1.0 | 1.0 |
| C.I. Acid Red 87[2] | — | — | — | 4.5 | 4.5 |
| C.I. Acid Red 92[3] | 1.0 | — | — | 1.0 | 1.0 |
| C.I. Acid Yellow 23[4] | — | 2.0 | — | 0.5 | 0.5 |
| C.I. Acid Blue 9[6] | 4.5 | 3.0 | — | — | — |
| C.I. Acid Black 19[7] | — | — | 30.0 | — | — |
| Viscosity[5] 20 ± 1° C. (cp) | | | | | |
| 2.5 rpm | — | — | — | — | 1410.7 |
| 5.0 rpm | — | — | — | — | 780.4 |
| 10.0 rpm | 269.2 | 249.1 | 251.6 | 84.5 | 452.4 |
| 20.0 rpm | 157.1 | 141.1 | 147.3 | 55.2 | — |
| 50.0 rpm | 84.3 | 79.5 | 81.7 | 33.0 | — |
| 100.0 rpm | 54.6 | 51.3 | 52.4 | 23.7 | — |
| Color of ink | Blue | Green | Black | Red | |

The following information is given in respect of [1] to [7] in Tables 1 and 2.
[1]Trademark "Kelzan", product of Sansho K.K., Japan.
[2]Trademark "Eosine", product of Hodagaya Kagaku Kogyo K.K., Japan.
[3]Trademark "Acid Phloxine PB", product of Hodagaya Kagaku Kogyo K.K., Japan.
[4]Trademark "Tartrazine", product of Hodagaya Kagaku Kogyo K.K., Japan.
[5]Measured by an ELD-type viscosimeter.
[6]Trademark "WATER BLUE #9", product of Orient Kagaku Kogyo K.K., Japan.
[7]Trademark "WATER BLACK 100-L", (about 20% by weight of dye solids), product of Orient Kagaku Kogyo K.K., Japan.

The ink compositions obtained above were each placed in a ball-point pen of the type as illustrated in FIG. 1 and were tested. Table 3 below shows the results. The ball-point pens as used in the tests comprise the following specific components.

(A) Ball 9: steel ball 0.4 mm in diameter.
(B) Forward end portion 7: a portion made of polyacetal and having a channel for passing of the composition with a diameter of 1.5 mm and a length of 7 mm.
(C) Member 5: a member produced by processing a sheaf of polyester fibers with resin to give a diameter of 3 mm and a length of 5 mm and a void volume of 60%.
(D) Tank 11: a container made of polypropylene and having an inner diameter of 3 mm and a length of 80 mm.

TABLE 3

| | Cap-off property | Flowability | Rapid writability | Accumulated residue of ink components |
|---|---|---|---|---|
| Ex. 1 | A | B | A | A |
| Ex. 2 | A | B | A | A |
| Ex. 3 | A | A | A | A |
| Ex. 4 | A | A | A | A |
| Ex. 5 | A | A | A | A |
| Ex. 6 | B | B | B | A |
| Ex. 7 | A | A | A | A |
| Ex. 8 | A | A | A | A |
| Ex. 9 | A | A | A | A |
| Comp. Ex. 1 | A | C | A | A |
| Comp. Ex. 2 | C | C | C | B |

EXAMPLES 10 TO 12

Ink compositions were prepared by using the materials shown in Table 4 below.

TABLE 4

| Component | Example 10 | 11 | 12 |
|---|---|---|---|
| Water | 62.55 | 62.5 | 62.45 |
| Xanthan gum[1] | 0.40 | 0.40 | 0.40 |
| Ethylene glycol | 10.0 | 10.0 | 10.0 |
| Glycerin | 20.0 | 20.0 | 20.0 |
| Sodium benzoate | 1.0 | 1.0 | 1.0 |
| Dialkyl sulfosuccinate[8] and/or its sodium salt | 0.05 | 0.10 | 0.15 |
| C.I. Acid Red 87[2] | 4.5 | 4.5 | 4.5 |
| C.I. Acid Red 92[3] | 1.0 | 1.0 | 1.0 |
| C.I. Acid Yellow 23[4] | 0.5 | 0.5 | 0.5 |
| Viscosity 20 ± 1°C. (cp) | | | |
| 2.5 rpm | — | — | — |
| 5.0 rpm | — | — | — |
| 10.0 rpm | 326.3 | 326.4 | 326.7 |
| 20.0 rpm | 192.9 | 193.2 | 192.5 |
| 50.0 rpm | 101.7 | 101.5 | 101.1 |
| 100.0 rpm | — | — | — |
| Color of ink | | Red | |

The particulars on [1] to [5] are the same as those in Table 2.
In respect of [8], the following commercial products were used:
Example 10: "Neocol P", (trademark, product of Daiichi Kogyo Seiyaku K.K., Japan).
Example 11: "Rapisol", (trademark, product of Nippon Yushi K.K., Japan).
Example 12: "Lipal", (trademark, product of Lion K.K., Japan).

The ink compositions obtained in Examples 10 to 12 were tested for the same properties as those shown in Table 3 and were evaluated all as A in any of the cap-off property, flowability, rapid writability and accumulated residue of ink components. These compositions were further checked for the ability to dry on writing by using a ball-point pen of the foregoing type and were found to dry in 35, 20 and 15 seconds in Examples 10, 11 and 12, respectively and to dry in over 80 seconds in any of Examples 10 to 12, when employing 62.6% by weight of water without use of dialkyl sulfosuccinate and/or its sodium salt.

EXAMPLES 13 TO 24 AND COMPARISON EXAMPLES 3 TO 6

Ink compositions were prepared by using the materials shown in Tables 5, 6 and 7.

TABLE 5

| Component | Example 13 | 14 | 15 | 16 | 17 | 18 |
|---|---|---|---|---|---|---|
| Water | 58.8 | 59.7 | 57.55 | 56.3 | 60.2 | 57.1 |
| Xanthan gum[1] | 0.20 | 0.30 | 0.45 | 0.20 | 0.30 | 0.40 |

TABLE 5-continued

| Component | Example 13 | 14 | 15 | 16 | 17 | 18 |
|---|---|---|---|---|---|---|
| Ethylene glycol | 20.0 | 20.0 | 20.0 | 15.0 | 15.0 | 15.0 |
| Glycerin | 10.0 | 10.0 | 10.0 | 15.0 | 15.0 | 15.0 |
| Sodium benzoate | 1.0 | 1.0 | 1.0 | 1.0 | 1.0 | 1.0 |
| C.I. Acid Red 87[2] | 4.5 | 4.5 | 4.5 | — | — | — |
| C.I. Acid Red 92[3] | 1.0 | 1.0 | 1.0 | 1.0 | 1.0 | 1.0 |
| C.I. Acid Yellow 23[4] | 0.5 | 0.5 | 0.5 | — | — | — |
| C.I. Acid Blue 9[6] | — | — | — | 4.5 | 4.5 | 4.5 |
| Permeable drying agent[9] | 4.0 | 3.0 | 5.0 | 7.0 | 3.0 | 6.0 |
| Viscosity[5] 20 ± 1° C. (cp) | | | | | | |
| 2.5 rpm | — | — | — | — | — | — |
| 5.0 rpm | — | — | 670.2 | — | — | — |
| 10.0 rpm | 123.0 | 224.0 | 391.4 | 121.0 | 222.5 | 326.2 |
| 20.0 rpm | 77.0 | 137.0 | 226.4 | 76.3 | 136.4 | 193.1 |
| 50.0 rpm | 45.0 | 72.7 | 118.0 | 43.4 | 72.1 | 101.9 |
| 100.0 rpm | 31.0 | 48.1 | — | 30.1 | 47.7 | — |
| Color of ink | Red | | | Blue | | |

TABLE 6

| Component | Example 19 | 20 | 21 | 22 | 23 | 24 |
|---|---|---|---|---|---|---|
| Water | 55.8 | 58.7 | 57.6 | 37.3 | 35.7 | 33.1 |
| Xanthan gum[1] | 0.20 | 0.30 | 0.40 | 0.20 | 0.30 | 0.40 |
| Ethylene glycol | 15.0 | 15.0 | 15.0 | 10.0 | 10.0 | 10.0 |
| Glycerin | 15.0 | 15.0 | 15.0 | 20.0 | 20.0 | 20.0 |
| Sodium benzoate | 1.0 | 1.0 | 1.0 | 1.0 | 1.0 | 1.0 |
| C.I. Acid Yellow 23[4] | 2.0 | 2.0 | 2.0 | — | — | — |
| C.I. Acid Blue 9[6] | 3.0 | 3.0 | 3.0 | — | — | — |
| C.I. Direct Black 19[7] | — | — | — | 30.0 | 30.0 | 30.0 |
| Anhydrous sodium carbonate | — | — | — | 0.5 | 0.5 | 0.5 |
| Permeable drying agent[9] | 8.0 | 5.0 | 6.0 | 1.0 | 2.5 | 5.0 |
| Viscosity[5] 20 ± 1° C. (cp) | | | | | | |
| 2.5 rpm | — | — | — | — | — | — |
| 5.0 rpm | — | — | — | — | — | — |
| 10.0 rpm | 11.2 | 223.0 | 326.5 | 125.0 | 226.4 | 327.1 |
| 20.0 rpm | 77.0 | 137.8 | 194.4 | 78.7 | 139.0 | 195.1 |
| 50.0 rpm | 43.7 | 72.5 | 102.6 | 47.0 | 74.2 | 103.1 |
| 100.0 rpm | 30.7 | 48.0 | — | 33.0 | 50.1 | — |
| Color of ink | Green | | | Black | | |

TABLE 7

| Component | Comp. Example 3 | 4 | 5 | 6 |
|---|---|---|---|---|
| Water | 59.85 | 59.5 | 62.6 | 47.7 |
| Xanthan gum[1] | 0.15 | 0.50 | 0.30 | 0.30 |
| Ethylene glycol | 20.0 | 20.0 | 20.0 | 20.0 |
| Glycerin | 10.0 | 10.0 | 10.0 | 10.0 |
| Sodium benzoate | 1.0 | 1.0 | 1.0 | 1.0 |

TABLE 7-continued

| Component | Comp. Example 3 | 4 | 5 | 6 |
|---|---|---|---|---|
| C.I. Acid Red 87[2] | 4.5 | 4.5 | 4.5 | 4.5 |
| C.I. Acid Red 92[3] | 1.0 | 1.0 | 1.0 | 1.0 |
| C.I. Acid Yellow 23[4] | 0.5 | 0.5 | 0.5 | 0.5 |
| Permeable drying agent[9] | 3.0 | 3.0 | 0.1 | 15.0 |
| Viscosity[5] 20 ± 1° C. (cp) | | | | |
| 2.5 rpm | — | 1411.2 | — | — |
| 5.0 rpm | — | 781.0 | — | — |
| 10.0 rpm | — | 452.2 | 224.4 | 226.1 |
| 20.0 rpm | 84.7 | — | 137.2 | 138.4 |
| 50.0 rpm | 56.0 | — | 72.8 | 74.1 |
| 100.0 rpm | 34.1 | — | 48.5 | 49.5 |
| Color of ink | Red | | | |

The notation in respect of [1] to [7] and [9] in Tables 5 to 7 is given below.
The details on [1] to [7] are the same as those in Table 2.
In respect of [9], the following permeable drying agents were used: ethylene glycol monoacetate in Example 13; ethylene glycol monophenyl ether in Examples 14, 17 and 22 and Comparison Examples 3 and 4; diethylene glycol monobutyl ether in Examples 15, 18, 20, 23 and 24 and Comparison Examples 5 and 6; ethylene glycol diacetate in Example 16; and diethylene glycol monobutyl ether acetate in Examples 19 and 21.

The ink compositions prepared above were each placed in a ball-point pen of the type illustrated in FIG. 1 and tested for the same properties as those shown in Example 1. Table 8 below shows the results.

TABLE 8

| Properties | Cap-off property | Flowability | Rapid writability | Accumulated residue of ink components | Drying ability | Blurring |
|---|---|---|---|---|---|---|
| Ex. 1 | A | B | A | A | 45 | A |
| Ex. 2 | A | A | A | A | 40 | A |
| Ex. 3 | B | B | B | A | 40 | A |
| Ex. 4 | A | A | A | A | 40 | A |
| Ex. 5 | A | A | A | A | 50 | A |
| Ex. 6 | A | A | A | A | 40 | A |
| Ex. 7 | A | A | A | A | 30 | A |
| Ex. 8 | A | A | A | A | 45 | A |
| Ex. 9 | A | A | A | A | 40 | A |
| Ex. 10 | A | A | A | A | 40 | A |
| Ex. 11 | A | A | A | A | 40 | A |
| Ex. 12 | A | A | A | A | 50 | A |
| Comp. Ex. 1 | A | C | A | A | 50 | B |
| Comp. Ex. 2 | C | C | C | B | 75 | A |
| Comp. Ex. 3 | A | A | A | A | 80 | A |
| Comp. Ex. 4 | A | A | A | A | 40 | C |

We claim:

1. An aqueous ink composition for ball-point pens which comprises (i) 84.5 to 99.7 parts by weight of an aqueous medium consisting of 40 to 95% by weight of water and 60 to 5% by weight of a hygroscopic wetting agent selected from the group consisting of dihydric alcohols, polyhydric alcohols, pyrrolidone, N-methyl-2-pyrrolidone, dimethylformamide and urea capable of inhibiting the evaporation of water, (ii) 0.1 to 15 parts by weight of a water-soluble or water-dispersible coloring agent and (iii) 0.2 to 0.45 part by weight of xanthan gum in 100 parts by weight of the total composition.

2. An aqueous ink composition as defined in claim 1 wherein the amount of xanthan gum is 0.30 to 0.40 part by weight in 100 parts by weight of the composition.

3. An aqueous ink composition as defined in claim 1 wherein the wetting agent is at least one of polhydric alcohols.

4. An aqueous ink composition as defined in claim 3 wherein the wetting agent is at least one dihydric alcohol selected from the group consisting of ethylene glycol, diethylene glycol, triethylene glycol, 1,3-propanediol, propylene glycol, 1,3-butylene glycol, 1,4-butanediol, 2,3-butylene glycol, neopentyl glycol, hexylene glycol and thiodiglycol.

5. An aqueous ink composition as defined in claim 3 wherein the wetting agent is at least one tri- or higher-hydric alcohol selected from the group consisting of glycerin, trimethylolethane, trimethlolpropane, 3-methyl pentane-1,3,5-triol, diglycerin and sorbitol.

6. An aqueous ink composition as defined in claim 1 wherein the wetting agent is at least one species selected from the group consisting of pyrrolidone, N-methyl-2-pyrrolidone, dimethylformamide and urea.

7. An aqueous ink composition as defined in claim 1 wherein the coloring agent is at least one of pigments.

8. An aqueous ink composition as defined in claim 7 wherein the pigment is at least one species selected from the group consisting of titanium oxide, carbon black, Carmine 6B, C.I. Pigment Red 112, C.I. Pigment Blue 15 and C.I. Pigment Green 7.

9. An aqueous ink composition as defined in claim 1 wherein the coloring agent is at least one of acid dyes.

10. An aqueous ink composition as defined in claim 9 wherein the acid dye is at least one species selected from the group consisting of C.I. Acid Red 87 C.I. Acid Red 92, C.I. Acid Yellow 23, C.I. Acid Blue 9, C.I. Acid Violet 49, C.I. Acid Blue 7, C.I. Acid Orange 56, C.I. Acid Black 2 and C.I. Acid Red 18.

11. An aqueous ink composition as defined in claim 1 wherein the coloring agent is at least one of direct dyes.

12. An aqueous ink composition as defined in claim 11 wherein the coloring agent is at least one species selected from the group consisting of C.I. Direct Black 19, C.I. Direct Black 38, C.I. Direct Black 154, C.I. Direct Orange 6, C.I. Direct Yellow 44, C.I. Direct Yellow 87 and C.I. Direct Blue 71.

13. An aqueous ink composition for ball-point pens which comprises (i) 74.5 to 99.2 parts by weight of an aqueous medium consisting of 33 to 95% by weight of water and 67 to 5% by weight of a wetting agent selected from the group consisting of dihydric alcohols, polyhydric alcohols, pyrrolidone, N-methyl-2-pyrrolidone, dimethylformamide and urea, (ii) 0.1 to 15 parts by weight of a water-soluble or water-dispersible coloring agent, (iii) 0.2 to 0.45 part by weight of xanthan gum and (iv) as a paper permeable drying agent 0.5 to 10 parts by weight of a paper permeable organic solvent in 100 parts by weight of the total composition, said drying agent being capable of penetrating through paper and fiber so as to enhance the drying ability of the ink and improve the property of producing a smooth writing.

14. An aqueous ink composition as defined in claim 13 wherein the amount of xanthan gum is 0.30 to 0.40 part by weight in 100 parts by weight of the composition.

15. An aqueous ink composition as defined in claim 13 wherein the permeable organic solvent is at least one of glycol ethers.

16. An aqueous ink composition as defined in claim 15 wherein the glycol ether is at least one species selected from the group consisting of ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monoisopropyl ether, diethylene glycol monobutyl ether, diethylene glycol monophenyl ether, ethylene glycol dimethyl ether, ethylene glycol diethyl ether, diethylene glycol dimethyl ether and propylene glycol monomethyl ether.

17. An aqueous ink composition as defined in claim 13 wherein the permeable organic solvent is at least one of glycol ether acetates.

18. An aqueous ink composition as defined in claim 17 wherein the glycol ether acetate is at least one species selected from the group consisting of ethylene glycol monomethyl ether acetate, ethylene glycol monomethyl ether acetate, ethylene glycol monobutyl ether acetate, ethylene glycol monophenyl ether acetate, diethylene glycol monomethyl ether acetate, diethylene glycol monoethyl ether acetate, diethylene glycol monobutyl ether acetate, diethylene glycol monophenyl ether acetate, diethylene glycol monoisopropyl ether acetate, ethylene glycol dimethyl ether acetate, ethylene glycol diethyl ether acetate, diethylene glycol dimethyl ether acetate and propylene glycol monomethyl ether acetate.

19. An aqueous ink composition as defined in claim 13 wherein the permeable organic solvent is at least one of glycol acetates.

20. An aqueous ink composition as defined in claim 19 wherein the glycol acetate is at least one species selected from the group consisting of ethylene glycol monoacetate, ethylene glycol diacetate and diethylene glycol diacetate.

21. An aqueous ink composition as defined in claim 13 wherein the wetting agent is at least one of polyhydric alcohols.

22. An aqueous ink composition as defined in claim 21 wherein the wetting agent is at least one dihydric alcohol selected from the group consisting of ethylene glycol, diethylene glycol, triethylene glycol, 1,3-propanediol, propylene glycol, 1,3-butylene glycol, 1,4-butanediol, 2,3-butylene glycol, neopentyl glycol, hexylene glycol and thiodiglycol.

23. An aqueous ink composition as defined in claim 21 wherein the wetting agent is at least one tri- or higher-hydric alcohol selected from the group consisting of glycerin, trimethylolethane, trimethlolpropane, 3-methyl pentane-1,3,5-triol, diglycerin and sorbitol.

24. an aqueous ink composition as defined in claim 13 wherein the wetting agent is at least one species selected from the group consisting of pyrrolidone, N-methyl-2-pyrrolidone, dimethylformamide and urea.

25. An aqueous ink composition as defined in claim 13 wherein the coloring agent is at least one of pigments.

26. An aqueous ink composition as defined in claim 25 wherein the pigment is at least one species selected from the group consisting of titanium oxide, carbon black, Carmine 6B, C.I. Pigment Red 112, C.I. Pigment Blue 15 and C.I. Pigment Green 7.

27. An aqueous ink composition as defined in claim 13 wherein the coloring agent is at least one of acid dyes.

28. An aqueous ink composition as defined in claim 27 wherein the acid dye is at least one species selected from the group consisting of C.I. Acid Red 87 C.I. Acid Red 92, C.I. Acid Yellow 23, C.I. Acid Blue 9, C.I. Acid Violet 49, C.I. Acid Blue 7, C.I. Acid Orange 56, C.I. Acid Black 2 and C.I. Acid Red 18.

* * * * *

UNITED STATES PATENT AND TRADEMARK OFFICE
CERTIFICATE OF CORRECTION

PATENT NO. : 4,545,818
DATED : October 8, 1985
INVENTOR(S) : INOUE et al

It is certified that error appears in the above-identified patent and that said Letters Patent is hereby corrected as shown below:

In the cover page of the patent, left-hand column, after "Assignee:" please delete "United Kingdom Atomic Energy Authority, England" and substitute therefor --Sakura Color Products Corp., Japan--.

Signed and Sealed this

Twenty-fifth Day of March 1986

[SEAL]

Attest:

Attesting Officer

DONALD J. QUIGG

Commissioner of Patents and Trademarks